(12) United States Patent
Jenkins et al.

(10) Patent No.: US 8,863,451 B2
(45) Date of Patent: Oct. 21, 2014

(54) PHOTOVOLTAIC ROOFING SYSTEMS AND METHODS FOR REPAIRING THEM

(71) Applicants: Robert L. Jenkins, Honeybrook, PA (US); Christopher C. Fisher, Philadelphia, PA (US)

(72) Inventors: Robert L. Jenkins, Honeybrook, PA (US); Christopher C. Fisher, Philadelphia, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 13/667,639

(22) Filed: Nov. 2, 2012

(65) Prior Publication Data

US 2013/0111831 A1 May 9, 2013

Related U.S. Application Data

(60) Provisional application No. 61/555,047, filed on Nov. 3, 2011.

(51) Int. Cl.
| | |
|---|---|
| *E04D 13/18* | (2014.01) |
| *E04H 14/00* | (2006.01) |
| *F24J 2/52* | (2006.01) |
| *H01L 31/048* | (2014.01) |
| *E04D 13/00* | (2006.01) |
| *E04D 3/38* | (2006.01) |
| *F24J 2/00* | (2014.01) |

(52) U.S. Cl.
CPC ............... *F24J 2/5203* (2013.01); *Y02B 10/12* (2013.01); *Y02E 10/47* (2013.01); *Y02B 10/20* (2013.01); *H01L 31/0482* (2013.01); *Y02E 10/50* (2013.01); *E04D 13/00* (2013.01); *E04D 3/38* (2013.01); *F24J 2002/0061* (2013.01); *F24J 2002/5296* (2013.01)

USPC ............ 52/173.3; 52/60; 52/302.6; 136/230; 126/623

(58) Field of Classification Search
USPC ................ 52/58, 59, 60, 173.3, 173.1, 302.6; 126/621, 622, 623; 136/251, 244, 206, 136/230
See application file for complete search history.

(56) References Cited

U.S. PATENT DOCUMENTS

| | | | |
|---|---|---|---|
| 3,893,506 A | 7/1975 | Laing | |
| 4,189,881 A | 2/1980 | Hawley | |
| 4,636,577 A * | 1/1987 | Peterpaul | ...................... 136/206 |
| 5,092,939 A | 3/1992 | Nath | |
| 5,273,608 A * | 12/1993 | Nath | ............................. 156/301 |

(Continued)

*Primary Examiner* — Chi Q Nguyen
(74) *Attorney, Agent, or Firm* — McDonnell Boehnen Hulbert & Berghoff LLP

(57) ABSTRACT

The present invention relates generally to photovoltaic systems. The present invention relates more particularly to photovoltaic roofing systems in which photovoltaic elements are disposed upon roofing elements such as shingles, tiles, shakes or slates. For example, in one embodiment, the present invention provides a photovoltaic roofing system for use on a roof deck, the photovoltaic system including a plurality of horizontally-arranged first photovoltaic roofing elements disposed on the roof deck, each having a top end and a bottom end; one or more first flashing elements disposed on the roof deck upwards from the first photovoltaic roofing elements, the first flashing element having a top end, and a bottom end overlapping the top end of one or more of the first photovoltaic roofing elements; and a plurality of horizontally-arranged second photovoltaic roofing elements disposed on the roof deck upwards from the one or more first flashing elements, each second photovoltaic roofing element having a top end, and a bottom end overlapping the top end of one or more of the first flashing elements, the second photovoltaic roofing elements not overlapping the bottom end of any of the first flashing elements.

21 Claims, 7 Drawing Sheets

(56) References Cited

U.S. PATENT DOCUMENTS

| | | | |
|---|---|---|---|
| 5,391,858 A | 2/1995 | Tourangeau | |
| 5,575,861 A | 11/1996 | Younan | |
| 5,647,916 A | 7/1997 | Guazzoni | |
| 5,961,737 A | 10/1999 | Glenn | |
| 5,990,414 A | 11/1999 | Posnansky | |
| 6,182,403 B1 | 2/2001 | Mimura | |
| 6,465,724 B1 | 10/2002 | Garvison | |
| 6,649,822 B2 | 11/2003 | Eguchi | |
| 6,759,630 B1 | 7/2004 | Tenute | |
| 6,967,278 B2 | 11/2005 | Hatsukaiwa | |
| 8,079,183 B2 | 12/2011 | Lenney | |
| 8,215,070 B2 | 7/2012 | Railkar | |
| 8,215,071 B2* | 7/2012 | Lenox | 52/173.3 |
| 8,646,228 B2* | 2/2014 | Jenkins | 52/173.3 |
| 8,677,702 B2* | 3/2014 | Jenkins | 52/173.3 |
| 2002/0134421 A1 | 9/2002 | Nagao | |
| 2005/0210806 A1 | 9/2005 | Guerra | |
| 2008/0271773 A1 | 11/2008 | Jacobs | |
| 2008/0276984 A1 | 11/2008 | Gumm | |
| 2009/0000221 A1 | 1/2009 | Jacobs | |
| 2009/0000222 A1 | 1/2009 | Kalkanoglu | |
| 2009/0000657 A1 | 1/2009 | Jacobs | |
| 2009/0133340 A1* | 5/2009 | Shiao et al. | 52/173.3 |
| 2009/0133738 A1* | 5/2009 | Shiao et al. | 136/251 |
| 2009/0133739 A1* | 5/2009 | Shiao et al. | 136/251 |
| 2009/0159118 A1 | 6/2009 | Kalkanoglu | |
| 2009/0178350 A1 | 7/2009 | Kalkanoglu | |
| 2009/0205270 A1* | 8/2009 | Shaw et al. | 52/173.3 |
| 2010/0146878 A1* | 6/2010 | Koch et al. | 52/173.3 |
| 2010/0170169 A1 | 7/2010 | Railkar | |
| 2010/0180523 A1 | 7/2010 | Lena | |
| 2010/0242381 A1 | 9/2010 | Jenkins | |
| 2011/0017278 A1 | 1/2011 | Kalkanoglu | |
| 2011/0030761 A1 | 2/2011 | Kalkanoglu | |
| 2011/0047901 A1 | 3/2011 | Dierbeck | |
| 2011/0132427 A1* | 6/2011 | Kalkanoglu et al. | 136/244 |
| 2011/0209420 A1* | 9/2011 | Roach et al. | 52/173.3 |
| 2011/0314753 A1 | 12/2011 | Farmer | |
| 2012/0085040 A1 | 4/2012 | Ketwitz | |
| 2012/0137600 A1 | 6/2012 | Jenkins | |
| 2012/0192509 A1 | 8/2012 | Chihlas | |
| 2012/0192512 A1 | 8/2012 | Gombarick | |
| 2012/0210660 A1 | 8/2012 | Livsey | |
| 2012/0222716 A1 | 9/2012 | Gillenwater | |
| 2012/0255244 A1 | 10/2012 | Hendrickson | |
| 2012/0313501 A1* | 12/2012 | Mizuno | 313/110 |

* cited by examiner

PHOTOVOLTAIC ROOFING SYSTEMS AND METHODS FOR REPAIRING THEM

CROSS-REFERENCE TO RELATED APPLICATIONS

This application claims priority to U.S. Provisional Patent Application Ser. No. 61/555,047, which is hereby incorporated by reference herein in its entirety.

BACKGROUND OF THE INVENTION

1. Field of the Invention

The present invention relates generally to photovoltaic systems. The present invention relates more particularly to photovoltaic roofing systems in which photovoltaic elements are disposed upon roofing elements such as shingles, tiles, shakes or slates.

2. Summary of the Related Art

The search for alternative sources of energy has been motivated by at least two factors. First, fossil fuels have become increasingly expensive due to increasing scarcity and unrest in areas rich in petroleum deposits. Second, there exists overwhelming concern about the effects of the combustion of fossil fuels on the environment due to factors such as air pollution (from $NO_x$, hydrocarbons and ozone) and global warming (from $CO_2$). In recent years, research and development attention has focused on harvesting energy from natural environmental sources such as wind, flowing water, and the sun. Of the three, the sun appears to be the most widely useful energy source across the continental United States; most locales get enough sunshine to make solar energy feasible.

Accordingly, there are now available components that convert light energy into electrical energy. Such "photovoltaic cells" are often made from semiconductor-type materials such as doped silicon in either single crystalline, polycrystalline, or amorphous form. The use of photovoltaic cells on roofs is becoming increasingly common, especially as device performance has improved. They can be used to provide at least a significant fraction of the electrical energy needed for a building's overall function; or they can be used to power one or more particular devices, such as exterior lighting systems.

Existing photovoltaic modules do not blend well aesthetically with conventional roofs, appearing as bulky boxes on top of the roof. Photovoltaic roofing elements are being developed that integrate photovoltaic materials into roofing products, but these have their own attendant problems. For example, the photovoltaic elements used to make such photovoltaic roofing elements can fail, which can reduce the power-generating potential of the roof, and cause electrical inefficiencies that can reduce the effectiveness of the system much more than would be expected from the loss of a single photovoltaic element. Accordingly, it is generally necessary to replace photovoltaic roofing element when its photovoltaic cell fails. Similarly, wiring, contacts, and other electrical components can fail and require replacement. But the architecture of conventional photovoltaic roofing systems can make replacement of parts difficult, as the photovoltaic roofing elements are typically installed like traditional roofing elements, permanently affixed to the roof with fasteners that are protected from the elements under layers of material. There remains a need for systems that address these deficiencies.

SUMMARY OF THE INVENTION

One aspect of the present invention is a photovoltaic roofing system for use on a roof deck, the photovoltaic roofing system comprising:

a plurality of horizontally-arranged first photovoltaic roofing elements disposed on the roof deck, each having a top end and a bottom end;

one or more first flashing elements disposed on the roof deck upwards from the first photovoltaic roofing elements, the first flashing element having a top end, and a bottom end overlapping the top end of one or more of the first photovoltaic roofing elements; and a plurality of horizontally-arranged second photovoltaic roofing elements disposed on the roof deck upwards from the one or more first flashing elements, each second photovoltaic roofing element having a top end, and a bottom end overlapping the top end of one or more of the first flashing elements, the second photovoltaic roofing elements not overlapping the bottom end of any of the first flashing elements.

Another aspect of the invention is a method for accessing the top end of a first photovoltaic element in a photovoltaic roofing system as described above, the method comprising lifting the bottom end of one or more of the first flashing elements away from the top end of the first photovoltaic element.

Another aspect of the invention is a method for accessing wiring in a photovoltaic roofing system as described above, the photovoltaic roofing system including wiring disposed beneath the one or more first flashing elements, the method comprising lifting the bottom end of one or more of the first flashing elements away from the top end of the first photovoltaic element, thereby exposing the wiring.

The photovoltaic roofing systems of the present invention can result in a number of advantages over prior art photovoltaic systems. For example, the photovoltaic roofing systems of the present invention can provide for ease of access to wiring and fasteners used in the installation of the photovoltaic roofing system, allowing components to be easily upgraded, repaired or replaced. Other advantages will become apparent to the person of skill in the art in view of the present disclosure.

The accompanying drawings are not necessarily to scale, and sizes of various elements can be distorted for clarity.

DETAILED DESCRIPTION OF THE INVENTION

Figure 1:
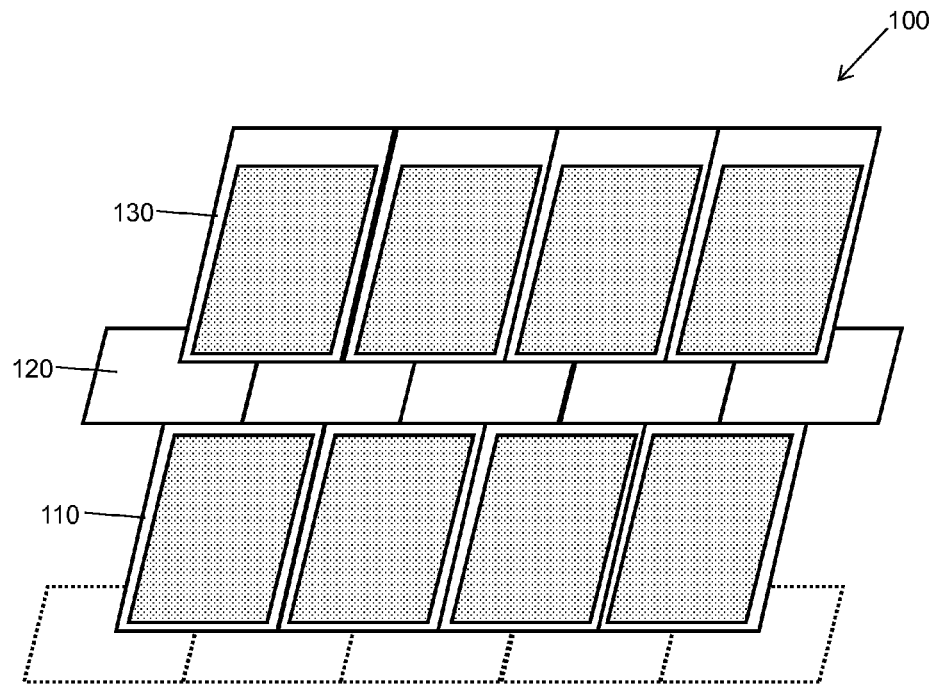
FIG. 1 is partial top schematic view and a partial schematic cross-sectional view of a photovoltaic roofing system according to one aspect of the invention.
Figure 1:
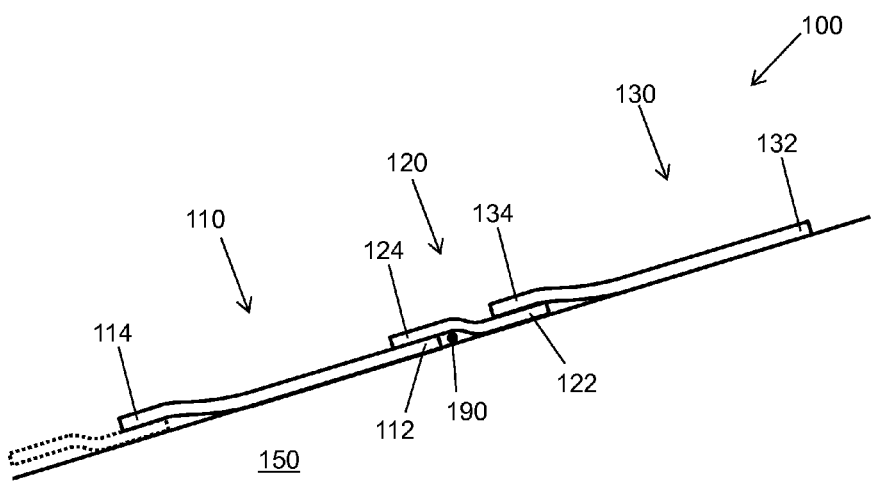
Figure 2:
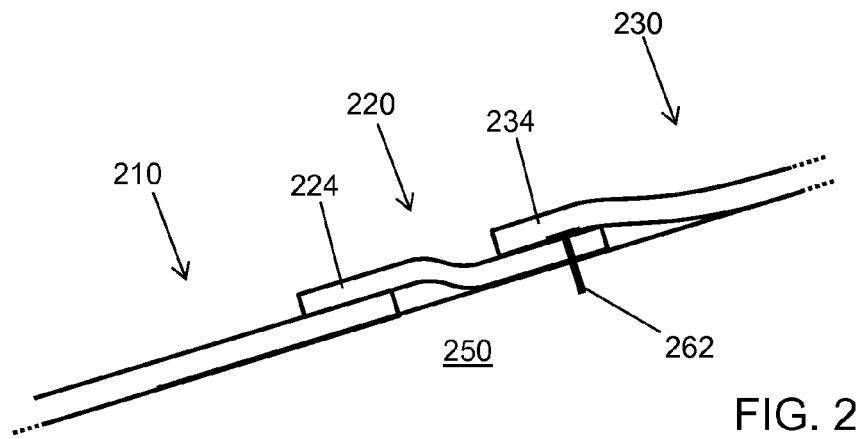
FIG. 2 is a partial schematic cross-sectional view of a photovoltaic roofing system according to one embodiment of the invention.

One embodiment of a photovoltaic roofing system according to one aspect of the present invention is shown in partial top schematic view and in partial schematic cross-sectional view (i.e., looking up the roof) in FIG. 1. Photovoltaic roofing system 100 is disposed on roof deck 150. It includes a plurality of horizontally-arranged first photovoltaic roofing elements 110 disposed on the roof deck. Each of the first photovoltaic roofing elements 110 includes a top end 112 and a bottom end 114. The photovoltaic roofing system also includes one or more first flashing elements 120 disposed on the roof deck. The one or more first flashing elements 120 are disposed upwards from the first photovoltaic roofing elements 110, that is, relatively more toward the ridge of the roof deck. Each first flashing element 120 has a top end 122 and a bottom end 124. The bottom end 124 of each first flashing element 120 overlaps the top end 112 of one or more of the first photovoltaic roofing elements 110. The photovoltaic roofing system 110 also includes a plurality of horizontally-arranged second photovoltaic roofing elements 130 disposed on the roof deck upwards from the one or more first flashing elements 120. Each second photovoltaic roofing element 130 has a top end 132 and a bottom end 134. The bottom end 134 of each second photovoltaic roofing element 130 overlaps the top end 122 of one or more of the first flashing elements 120. The second photovoltaic roofing elements, however, do not overlap the bottom end of any of the first flashing elements. In FIG. 1 (and subsequent figures), the flashing element is shown schematically as having a slight "S" shape to it, such that it lays flat against the roof at its top end and lays on top of the underlying first photovoltaic roofing element. However, as the person of skill in the art would appreciate, in practice the flashing element may not exhibit a pronounced curvature, especially when it is relatively thin and/or relatively rigid. Moreover, as shown in the embodiment of FIG. 6, the various elements can be relatively rigid, such that they remain canted with respect to the roof deck. 2-10 with the FIGS. 2-10 on the four Replacement Sheets of drawings submitted herewith.

In certain embodiments, and as shown in FIG. 1, the second photovoltaic roofing elements 130 do not overlap the first photovoltaic roofing elements 110. In such embodiments, the first photovoltaic roofing elements can be removed from the roof without having to detach, lift, or otherwise move the second photovoltaic roofing elements.

In certain embodiments, the photovoltaic roofing system further includes wiring interconnecting the photovoltaic roofing elements. The wiring can be disposed beneath the one or more first flashing elements. For example, as shown in FIG. 1, wiring 190 underlies the first flashing element 120. Accordingly, the wiring can be accessed for repair by moving or detaching the first flashing element, without having to move or detach any photovoltaic roofing elements.

In one embodiment of the invention, the first photovoltaic roofing elements are affixed to the roof deck by one or more fasteners, which are overlapped by the one or more flashing elements. One example of such an embodiment is shown in partial schematic cross-sectional view in FIG. 2. First photovoltaic roofing element 210 is affixed to the roof deck 250 by fasteners 260, which the bottom end 124 of the first flashing element 120 overlaps. The fasteners can be, for example, nails, staples or screws, driven through the photovoltaic roofing element and into the roof deck. The person of skill in the art will appreciate that other fasteners can be used. When the fasteners penetrate the photovoltaic roofing element and the roof deck, it can create a leak point; the use of the flashing to overlap the fastener can help prevent a leak. Similarly, in the embodiment of FIG. 2, the first flashing element 220 is affixed to roof deck by fasteners 262, which the bottom end 234 of the second photovoltaic roofing element 230 overlaps.

Figure 3:
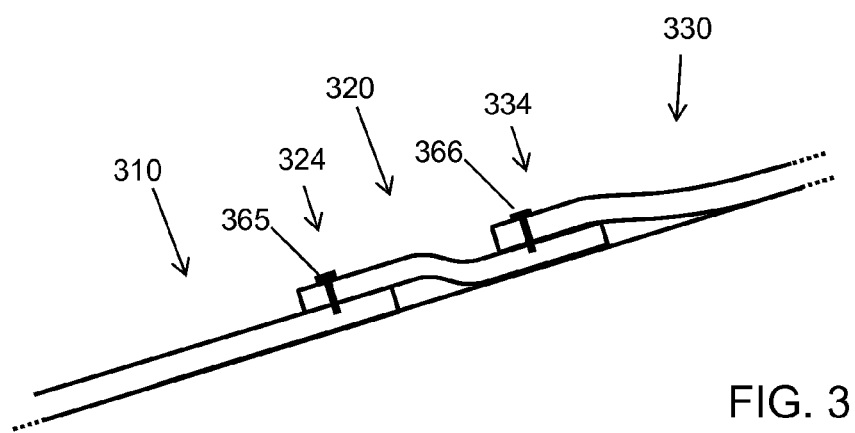
FIG. 3 is a partial schematic cross-sectional view of a photovoltaic roofing system according to another embodiment of the invention.

In certain embodiments, the first flashing element is affixed with a fastener to the first photovoltaic roofing element that it overlaps. Preferably, the fastener does not penetrate both the first flashing element and the first photovoltaic roofing element, i.e., so that it does not create a leak point through the flashing and the first photovoltaic roofing element. For example, as shown in FIG. 3, fastener 365 affixes the bottom end 324 of the first flashing element 320 to the first photovoltaic roofing element 310. In this embodiment, the fastener 365 does not extend all the way through the first photovoltaic roofing element 310, so no leak point is created. A variety of fasteners can be used, for example, snaps, staples, screws or nails. The fastener can be undone in order to allow the bottom end of the first flashing element to be lifted, allowing access to any wiring or fasteners underneath. Similarly, in the embodiment of FIG. 3, a fastener 366 affixes the bottom end 334 of the second photovoltaic roofing element 330

In certain embodiments, the first flashing element interlocks with the first photovoltaic roofing element. For example, a feature (such as a ridge, a groove or a flange) on the first flashing element can interlock with a corresponding feature (such as a groove, a flange or a corner) on the first photovoltaic roofing element. For example, as shown in schematic cross-sectional view FIG. 4, first flashing element 420 includes a downward-facing flange 425 on its bottom end 424, which interacts with a groove 415 formed in the upward-facing surface of the top end 412 of the first photovoltaic roofing element 410. Similarly, in certain embodiments, the first flashing element interlocks with the second photovoltaic roofing element. For example, a feature (such as a ridge, a groove or a flange) on the first flashing element can interlock with a corresponding feature (such as a groove, a flange or a corner) on the second photovoltaic roofing element. For example, as shown in schematic cross-sectional view FIG. 4, first flashing element 420 includes an upward-facing flange 426 on its top end 422, which interacts with a groove 435 formed in the downward-facing surface of the bottom end 434 of the second photovoltaic roofing element 430. In certain embodiments, the interlocking mechanisms are configured such that the pieces "snap" into place and are held there against non-negligible force. That is, the flashing element is resiliently held to the photovoltaic roofing element by the interlocking mechanism. The interlocking mechanisms can take other forms than those specifically exemplified in FIG. 4.

Desirably, the pieces can be unsnapped (e.g., by prying them apart), such that the area under the flashing element can be accessed. Such interlocking mechanisms can help to keep the flashing elements in place, even when they are only fastened via a relatively few fasteners. Interlocking mechanisms can be especially helpful under conditions in which wind could otherwise work underneath the photovoltaic roofing elements and lift them away from the roof deck.

Figure 4:
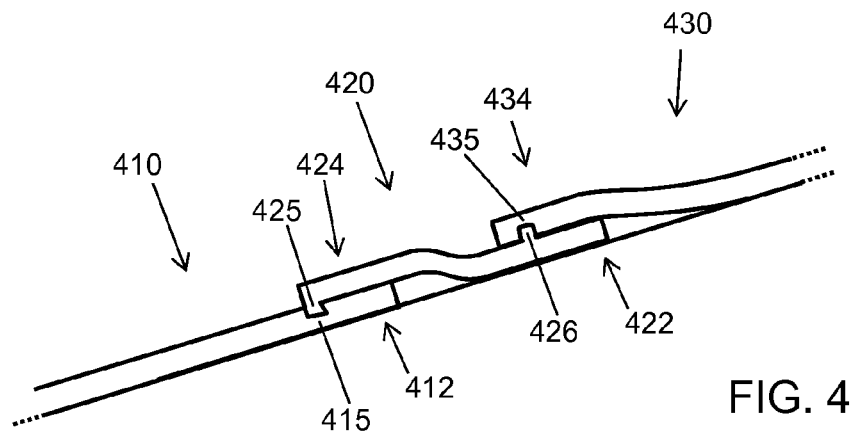
FIG. 4 is a partial schematic cross-sectional view of a photovoltaic roofing system according to another embodiment of the invention.
Figure 5:
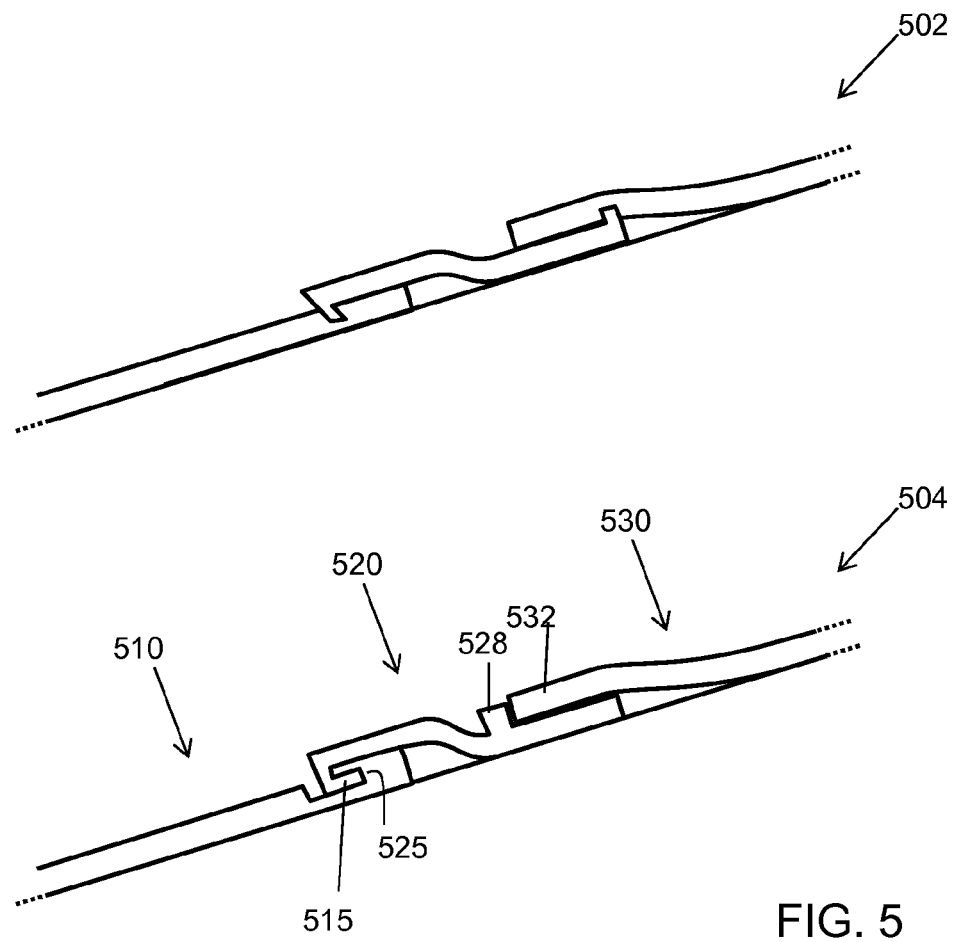
FIG. 5 is a pair of partial schematic cross-sectional views of photovoltaic roofing systems according to additional embodiments of the invention.
Figure 6:
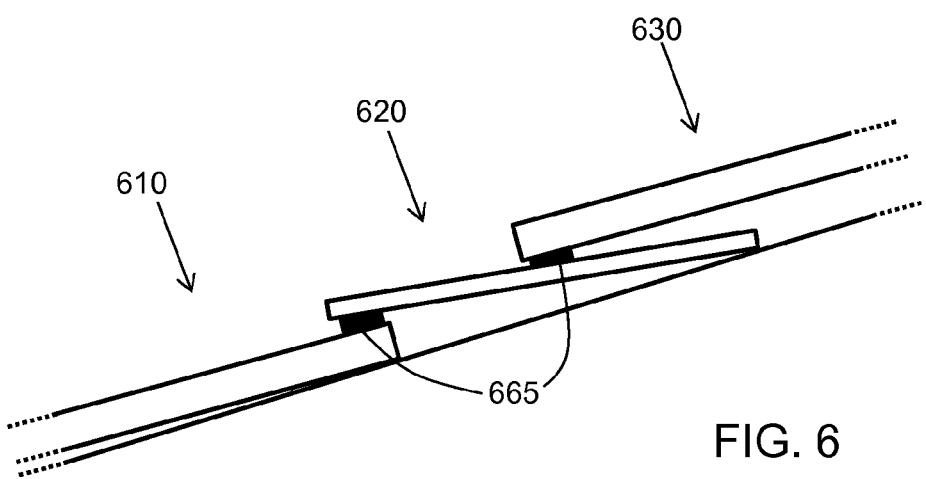
FIG. 6 is a partial schematic cross-sectional view of a photovoltaic roofing system according to another embodiment of the invention.

A few other configurations for flashing elements are shown in FIG. 5. The groove can be formed perpendicular to the plane of the roof deck, as shown in FIG. 4. In other embodiments, as shown in the photovoltaic roofing system 502 of FIG. 5, the groove can be formed so as to slant toward the bulk of the flashing element relative to the perpendicular to the plane of the roof deck. In certain such embodiments, the material of the flashing element can flex somewhat to allow the flashing element to be installed or removed, and can otherwise hold the flashing element in place, optionally without fasteners being used at all. In another embodiment, shown in the photovoltaic roofing system 504 of FIG. 5, a groove 525 formed in the flashing element 520 can interact with a flange 515 formed in the first photovoltaic roofing element. In other embodiments, also shown in the photovoltaic roofing system 504 of FIG. 5, the flashing element includes an upward-facing flange 528 that can abut the bottom end 532 of the second photovoltaic roofing element.

In certain embodiments, the photovoltaic roofing system further includes a gasket material disposed between the first flashing element and the first photovoltaic roofing element; between the first flashing element and the second photovoltaic roofing element; or both. The gasket material can help prevent the ingress of water between the various elements of the photovoltaic roofing system. Rubbery materials, solid or formed could be used as gasket materials. The gasket material is preferably a polymer, e.g., with a Shore A hardness in the range of 30-100. For example, the gasket can in certain embodiments be formed from EPDM or neoprene. The gasket can be provided, for example, at thicknesses in the range of 0.2 mm to about 1 cm. The gasket material can be provided as part of a photovoltaic roofing element; part of the flashing element; or as a separate material. An example of such an embodiment is shown in schematic cross-sectional view in FIG. 6. In FIG. 6, photovoltaic roofing system 600 includes a first photovoltaic roofing element 610, a second photovoltaic roofing element 630, and a first flashing element 620 substantially as described above. A gasket material 665 is disposed between the first photovoltaic roofing element 610 and the first flashing element 620; and between the first flashing element 620 and the second photovoltaic roofing element 630. The gasket material can be formed, for example, by disposing a curable composition (e.g., an epoxy) on one of the surfaces and pressing them together to fit. The pressure will form a gasket that fills the space between the elements. In such an embodiment, the material is preferably not adhesive, such that the elements can easily be separated at a later time. The gasket can be flat, or in other embodiments can be rounded in cross-section. One or both surfaces that interact with the gasket can include a recess into which the gasket partially fits.

In certain embodiments, the top surface of the first flashing element is adhered to the bottom surface of a second photovoltaic roofing element. Similarly, in certain embodiments, the bottom surface of the first flashing element is adhered to the top surface of a first photovoltaic roofing element. Thus, the first flashing element can be sealed to one or more of the photovoltaic roofing element, thereby providing additional waterproofing and reducing the amount of wind uplift of the various elements. The sealed location can be continuous or discontinuous, e.g., in multiple bands or in a combination of solid and interrupted bands. A variety of materials can be used to provide the adhesive. For example, when a pressure-sensitive adhesive is employed, the elements can be pulled apart in order to access items underneath, as described above, then stuck back together with the application of pressure. The adhesive can be provided on either surface or both to be adhered to one another. A peel-and-stick adhesive can be used, so that during installation, a protective layer (e.g., a release film) can be peeled away to expose adhesive, which can be used to adhere the parts.

Figure 7:
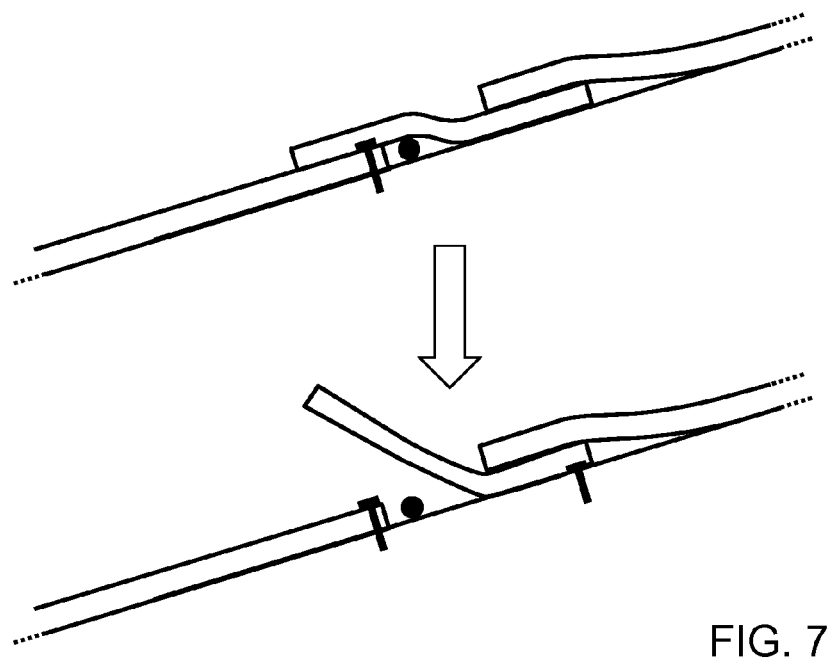
FIG. 7 is a partial schematic cross-sectional view of a photovoltaic roofing system according to another embodiment of the invention, demonstrating lifting the bottom end of first flashing element away from the top end of the first photovoltaic element.

In certain embodiments, the present invention provides flashings that can be lifted up to access any fasteners and wiring underneath. Accordingly, in one embodiment of the invention, the flashing element includes a hinge that allows its bottom end to be lifted away from the surface of the first photovoltaic element by at least about 3 inches (more preferably, at least about 6 inches). In another embodiment, at least a portion of the flashing element is flexible enough such that its bottom end can be lifted away from the surface of the first photovoltaic element by at least about 3 inches (more preferably, at least about 6 inches) without undergoing plastic deformation. For example, FIG. 7 is a schematic cross-sectional view of a photovoltaic roofing system, showing the bottom end of the flashing element being lifted away from the surface of the first photovoltaic roofing element to provide access to any wiring and any fasteners disposed beneath. As shown in FIG. 7, the top end of the flashing element can be affixed to the roof deck using a conventional fastener; as it is covered by the second photovoltaic roofing element, creation of a leak point here is not an important consideration.

Figure 8A:
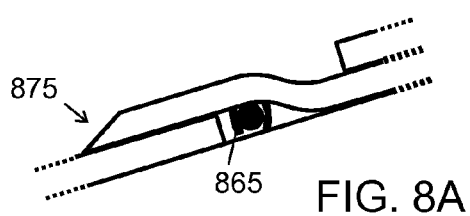
FIGS. 8A-8C are schematic cross-sectional views of wire management features on the downward-facing surface of first flashing elements according to various embodiments of the invention.
Figure 8B:
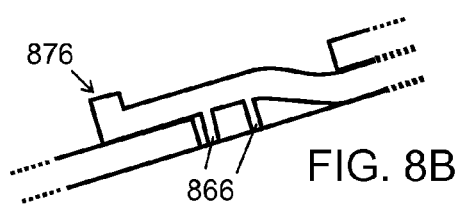
Figure 8C:
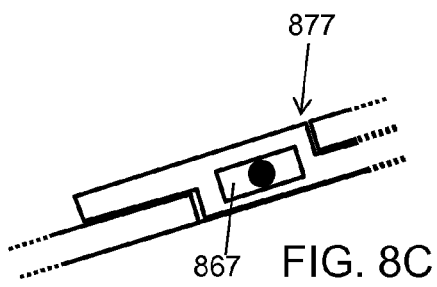

In certain embodiments, each first flashing element has wire management features on its downward-facing surface, as shown in schematic cross-sectional view in FIGS. 8A, 8B and 8C. For example, in one embodiment, shown in FIG. 8A, the downward-facing surface of each first flashing element includes wire clips or ties 865, which hold the wire in place. In another embodiment, shown in FIG. 8B, the downward-facing surface of each first flashing element has one or more downward-facing flanges 866, which, together with the roof deck (or other surface upon which the first flashing element is immediately disposed), can form a channel through which wiring can run. Alternatively, as shown in FIG. 8C, the downward-facing surface of each first flashing element can have a conduit 867 formed thereon (continuously or discontinuously).

In certain embodiments, the first flashing elements include one or more features that prevent wind uplift of the second photovoltaic element. Three such configurations of such features 875, 876 and 877 are shown in cross-sectional schematic view in FIGS. 8A, 8B and 8C.

In certain embodiments, the material of the first flashing element is relatively rigid. For example, in certain embodiments, the rigid material has a Young's Modulus of at least about 30,000 psi and a Shore D Durometer Hardness measurement of greater than 45. In certain embodiments, the material of the first flashing element is polycarbonate, aluminum, or a rigid polypropylene. This can help to provide support to the overall assembly, as well as provide protection for any wiring or components underlying the first flashing elements. In such embodiments, a hinge can be used as described above to allow the flashing element to be lifted.

In certain embodiments, at least part of the upward facing surface of each first flashing element is slip-resistant. For example, the upward-facing surface can have grit, sand, glass cullet, or other particulate matter affixed thereto, for example as described in U.S. Patent Application Publication no. 2009/

0000221, which is hereby incorporated herein by reference in its entirety. In such embodiments, the flashing elements can provide a slip-resistant place for a worker to walk, without having to step on the photovoltaic roofing elements. For example, such embodiment is shown in schematic cross-sectional view in FIG. 9. The upward-facing surface of first flashing element 920 has a slip-resistant material 928 disposed thereon (here, grit partially embedded in a polymer material). The grit can, for example, be colored and/or patterned to provide an aesthetically-desired appearance. For example, the grit can be patterned to provide a shadow line, as is conventional for roofing shingles. Roofing granules can also be used as the particulate matter, in which case it can likewise be colored and/or patterned to provide an aesthetically-desired appearance.

Figure 9:
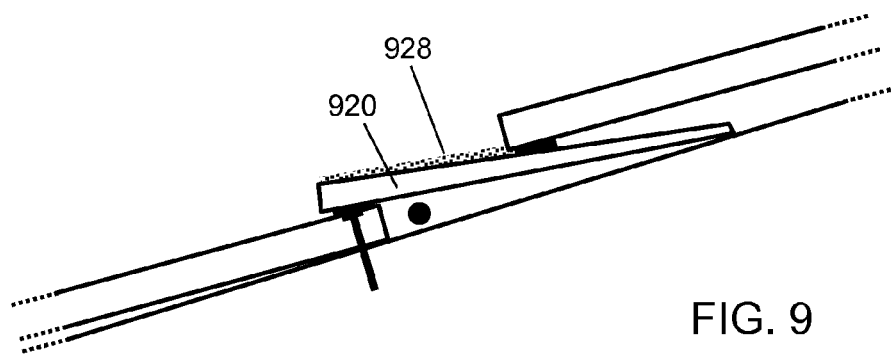
FIG. 9 is a partial schematic cross-sectional view of a photovoltaic roofing system according to another embodiment of the invention.

The flashing element can have a variety of cross-sectional shapes. In the embodiment of FIG. 9, the flashing element 920 is shown as being wedge-shaped, with the thick end down-roof of the thin end.

In certain embodiments, the exposed area of the first flashing element has a dimension up the roof in the range of about 2 inches to about 12 inches. For example, in the schematic perspective view of FIG. 10, the exposed area of a first flashing element is denoted by reference numeral 1027, and its dimension up the roof is denoted by "D". When this dimension is in the range of about 2 inches to about 12 inches, it can provide adequate room to allow access to underlying wires or fasteners, without taking up an inordinate amount of roof space that could otherwise be used for power generation.

Figure 10:
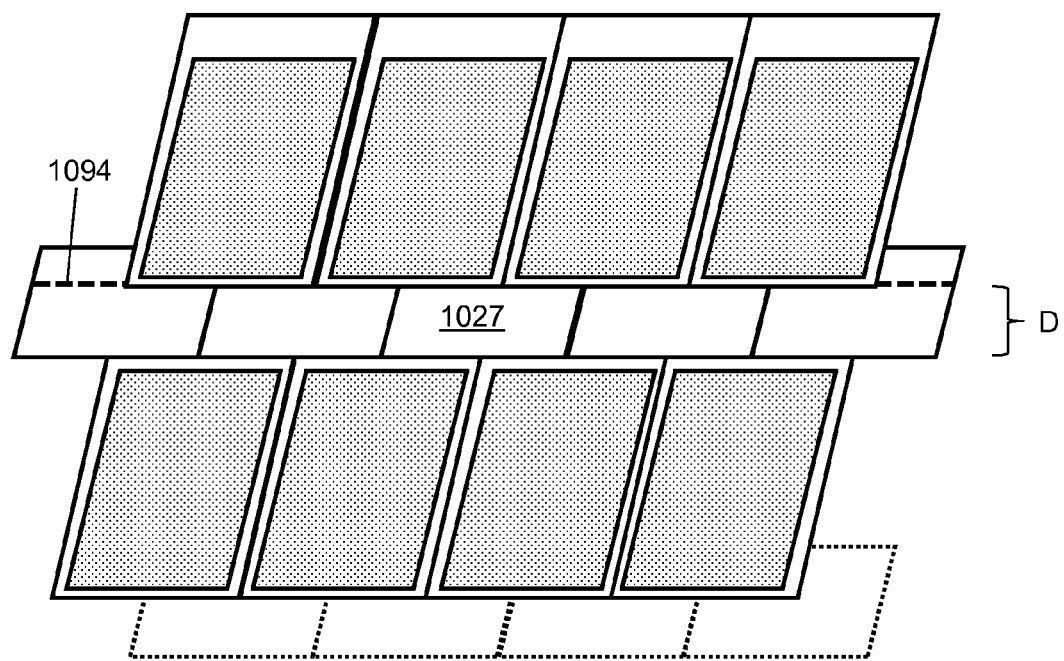
FIG. 10 is a partial schematic perspective view of a photovoltaic roofing system according to another embodiment of the invention.

In certain embodiments, the flashing elements can include alignment features that delineate where an overlying photovoltaic roofing element is to be placed. Such an alignment feature is shown in FIG. 10 by reference numeral 1094. Alignment features can be provided that help to keep an overlying course of photovoltaic roofing elements level; and can be used to set the spacing between adjacent photovoltaic roofing elements on the overlying course. In one aspect the alignment feature 1094 can be a visual indicator to guide the locating of flashing element 1027. In another aspect, the alignment feature 1094 can have a three dimensional structure for a mechanical assistance in alignment of the flashing element relative to the photovoltaic roofing elements.

Figure 11:
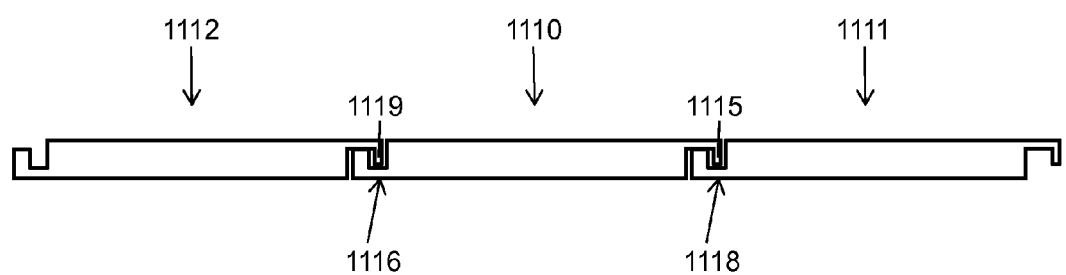
FIG. 11 is a partial schematic cross-sectional view of an interlocking photovoltaic roofing elements according to one embodiment of the invention.

In certain embodiments, horizontally adjacent photovoltaic roofing elements overlap with one another, for example to prevent ingress of moisture in between them. In one such embodiment, a sealant can be used to seal overlapping photovoltaic roofing elements to one another, to further prevent ingress of moisture therebetween. In other embodiments, the photovoltaic roofing elements include features that interlock with horizontally adjacent photovoltaic roofing elements to close off the roof deck from moisture. For example, in the embodiment shown in partial schematic cross-sectional view (i.e., now looking up the roof) in FIG. 11, the central photovoltaic roofing element 1110 has a downward-facing flange 1115 on its right side that interlocks with a channel 1118 formed on the left side of the right-hand photovoltaic roofing element 1111. Similarly, the central photovoltaic roofing element 1110 has a channel 1116 formed on its left side that interlocks with a downward-facing flange 1119 formed on the right hand side of the left-hand photovoltaic roofing element 1112. Such interlocking designs are described in more detail, for example, in U.S. Provisional Patent Application Ser. No. 61/429,053, which is hereby incorporated herein by reference in its entirety. Such features can, for example, be formed in the polymeric tiles formed in U.S. Patent Application Publication no. 2009/0000222, which is hereby incorporated herein by reference in its entirety.

Figure 12:
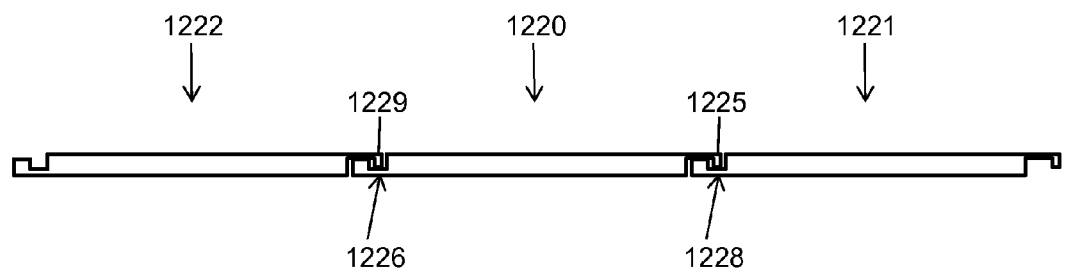
FIG. 12 is a partial schematic cross-sectional view of an interlocking flashing elements according to one embodiment of the invention.

Similarly, in certain embodiments, horizontally adjacent flashing elements overlap with one another, for example to prevent ingress of moisture in between them. In one such embodiment, a sealant can be used to seal overlapping flashing elements to one another, to further prevent ingress of moisture therebetween. In other embodiments, the flashing elements include features that interlock with horizontally adjacent flashing elements to close off the roof deck from moisture. For example, in the embodiment shown in partial schematic cross-sectional view (looking up the roof) in FIG. 12, the central flashing element 1220 has a downward-facing flange 1225 on its right side that interlocks with a channel 1228 formed on the left side of the right-hand flashing element 1221. Similarly, the central flashing element 1220 has a channel 1226 formed on its left side that interlocks with a downward-facing flange 1229 formed on the right hand side of the left-hand flashing element 1222.

The embodiments thus far have been described with respect to one set of horizontally-arranged flashing elements disposed between two sets of horizontally arranged photovoltaic roofing elements. As the person of skill in the art will appreciate, this arrangement can continue up the roof. For example, in certain embodiments, the photovoltaic roofing system further includes one or more second flashing elements disposed on the roof deck upwards from the second photovoltaic roofing elements, each second flashing element having a top end, and a bottom end overlapping the top end of one or more of the second photovoltaic roofing elements; and a plurality of horizontally-arranged third photovoltaic roofing elements disposed on the roof deck upwards from the one or more second flashing elements, each third photovoltaic roofing element having a top end, and a bottom end overlapping the top end of one or more of the second flashing elements, the third photovoltaic roofing elements not overlapping the bottom end of any of the second flashing elements. Similarly, such a photovoltaic roofing system can further include one or more third flashing elements disposed on the roof deck upwards from the third photovoltaic roofing elements, each third flashing element having a top end, and a bottom end overlapping the top end of one or more of the third photovoltaic roofing elements; and a plurality of horizontally-arranged fourth photovoltaic roofing elements disposed on the roof deck upwards from the one or more third flashing elements, each fourth photovoltaic roofing element having a top end, and a bottom end overlapping the top end of one or more of the third flashing elements, the fourth photovoltaic roofing elements not overlapping the bottom end of any of the third flashing elements. Such a pattern can continue up the roof until the desired amount of space is equipped with photovoltaic roofing elements. For example, a photovoltaic roofing system with four courses of photovoltaic roofing elements is shown in partial schematic perspective view in FIG. 13. The additional flashings and photovoltaic roofing elements can be substantially as described above with respect to the first flashing elements and the first and second photovoltaic roofing elements.

Figure 13:
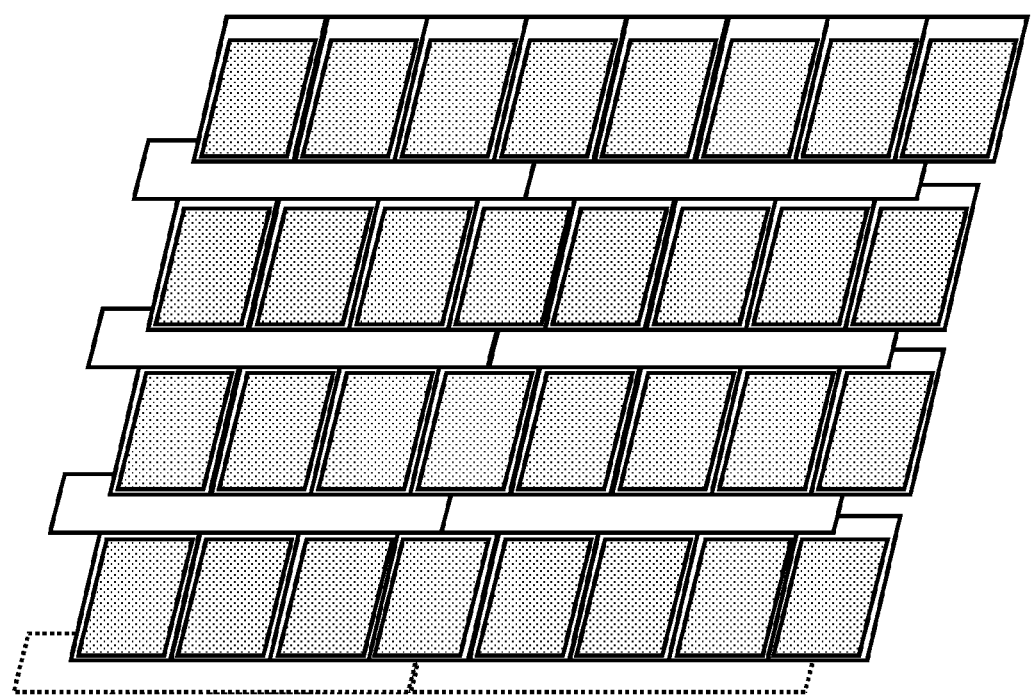
FIG. 13 is a partial schematic perspective view of a photovoltaic roofing system according to one embodiment of the invention.

As used herein, flashing elements do not have photovoltaic media disposed thereon. The flashing elements can be made out of a variety of materials. For example, they can be formed from plastic, or from metal. In certain embodiments, the flashing elements are formed from roofing materials, such as bituminous materials (e.g., granule-coated asphalt shingle material), roofing membrane material, or polymeric material. For example, the flashing elements can be made from the material that forms the base material of the photovoltaic roofing elements. Flashing elements can in some embodiments be formed in relatively long strips, i.e., such that a single striplike flashing element extends along a plurality of adjacent horizontally-disposed photovoltaic roofing elements (e.g., as shown in FIG. 13). In other embodiments, the flashing elements can have on the order of the same horizontal dimension as the photovoltaic roofing elements. In such configurations, the flashing elements can be offset somewhat from the vertically-adjacent photovoltaic roofing elements, such that the interface between horizontally-adjacent flashing elements does not substantially vertically align with the interfaces between horizontally-adjacent photovoltaic roofing elements that are vertically adjacent to the flashing elements. An example of such a configuration is shown in FIG. 1, in which photovoltaic roofing elements are denoted by reference numerals 110 and 130 and flashing elements are denoted by reference numerals 120. The interfaces between horizontally adjacent flashing elements do not substantially vertically align with the interfaces between horizontally adjacent photovoltaic roofing elements.

A wide variety of photovoltaic roofing elements can be used in practicing the various aspects of the present invention. As used herein, a photovoltaic roofing element includes a roofing element, with a photovoltaic element disposed thereon. The photovoltaic element affixed to the roofing element (either permanently or removably). Examples of photovoltaic roofing elements suitable for use in practicing various aspects of this invention include those described in U.S. Patent Application Publications nos. 2008/0271773, 2009/0000221, 2009/0000222, 2009/0133340, 2009/0133738, 2009/0133739, 2009/0133740, 2009/0159118, 2009/0178350, 2009/0205270, 2009/0242015, 2010/0146878, 2011/0132427, 2011/0209420, 2011/0017278, 2011/0030761; U.S. patent application Ser. Nos. 13/243,726, 13/162,830; and U.S. Provisional Patent Applications Ser. Nos. 61/429,053, 61/528,607 and 61/528,631, each of which is hereby incorporated herein by reference in its entirety.

Photovoltaic elements suitable for use in the present invention generally comprise one or more interconnected photovoltaic cells. The photovoltaic cells can be based on any desirable photovoltaic material system, such as monocrystalline silicon; polycrystalline silicon; amorphous silicon; III-V materials such as indium gallium nitride; II-VI materials such as cadmium telluride; and more complex chalcogenides (group VI) and pnicogenides (group V) such as copper indium diselenide or CIGS. For example, one type of suitable photovoltaic cell includes an n-type silicon layer (doped with an electron donor such as phosphorus) oriented toward incident solar radiation on top of a p-type silicon layer (doped with an electron acceptor, such as boron), sandwiched between a pair of electrically-conductive electrode layers. Thin-film amorphous silicon materials can also be used, which can be provided in flexible forms. Another type of suitable photovoltaic cell is an indium phosphide-based thermo-photovoltaic cell, which has high energy conversion efficiency in the near-infrared region of the solar spectrum. Thin film photovoltaic materials and flexible photovoltaic materials can be used in the construction of photovoltaic elements for use in the present invention. In one embodiment of the invention, the photovoltaic element includes a monocrystalline silicon photovoltaic cell or a polycrystalline silicon photovoltaic cell.

The photovoltaic element can optionally comprise various other materials and features, such as a backing substrate (e.g., plastic or metal sheet); a protective covering (e.g., a polymeric film or glass sheet); a granule-coated layer as described in U.S. Patent Application Publication no. 2008/0271773, which is hereby incorporated herein by reference its entirety; an opaque, semi-opaque, colored or patterned cover element as described in U.S. Patent Application Publication no. 2009/0000221, which is hereby incorporated herein by reference in its entirety; mounting structures (e.g., clips, holes, or tabs); and one or more optionally connectorized electrical cables for electrically interconnecting the photovoltaic cell(s) of the encapsulated photovoltaic element with an electrical system. The person of skill in the art will recognize that photovoltaic elements for use in the present invention can take many forms, and include many materials and features not specifically mentioned here.

The photovoltaic elements can be encapsulated photovoltaic elements, in which photovoltaic cells are encapsulated between various layers of material. For example, encapsulated photovoltaic element can include a top layer material at its top surface, and a bottom layer material at its bottom surface. The top layer material can, for example, provide environmental protection to the underlying photovoltaic cells, and any other underlying layers. Examples of suitable materials for the top layer material include fluoropolymers, for example ETFE (e.g., NORTON® ETFE films available from Saint-Gobain), PFE, FEP (e.g., NORTON® FEP films available from Saint-Gobain), PCTFE or PVDF. The top layer material can alternatively be, for example, a glass sheet, or a non-fluorinated polymeric material. The bottom layer material can be, for example, a fluoropolymer, for example ETFE, PFE, FEP, PVDF or PVF ("TEDLAR"). The bottom layer material can alternatively be, for example, a polymeric material (e.g., polyester such as PET, or polyolefin such as polyethylene); or a metallic material (e.g., stainless steel or aluminum sheet).

As the person of skill in the art will appreciate, an encapsulated photovoltaic element can include other layers interspersed between the top layer material and the bottom layer material. For example, an encapsulated photovoltaic element can include structural elements (e.g., a reinforcing layer of glass fiber, microspheres, metal or polymer fibers, or a rigid film); adhesive layers (e.g., EVA to adhere other layers together); mounting structures (e.g., clips, holes, or tabs); and one or more optionally connectorized electrical cables for electrically interconnecting the photovoltaic cell(s) of the encapsulated photovoltaic element with an electrical system. One example of an encapsulated photovoltaic element suitable for use in the present invention includes the following layers encapsulated together, in top to bottom order: a top protective layer (e.g., glass or a fluoropolymer film such as ETFE, PVDF, FEP, PFA or PCTFE); an encapsulant layer (e.g., EVA, functionalized EVA, crosslinked EVA, silicone, thermoplastic polyurethane, maleic acid-modified polyolefin, ionomer, or ethylene/(meth)acrylic acid copolymer); a layer of electrically-interconnected photovoltaic cells; another encapsulant layer; and a backing layer (e.g., PVDF, PVF, PET).

The photovoltaic element can include at least one antireflection coating, for example as the top layer material in an encapsulated photovoltaic element, or disposed between the top layer material and the photovoltaic cells.

Suitable photovoltaic elements and/or photovoltaic cells can be obtained, for example, from China Electric Equipment Group of Nanjing, China, as well as from several domestic suppliers such as Uni-Solar, Sharp, Shell Solar, BP Solar, USFC, FirstSolar, General Electric, Schott Solar, Evergreen Solar and Global Solar. Thin film-based photovoltaic cells can be especially suitable due to their durability, low heat generation, and off-axis energy collection capability. The person of skill in the art can fabricate encapsulated photovoltaic elements using techniques such as lamination or autoclave processes. Encapsulated photovoltaic elements can be made, for example, using methods disclosed in U.S. Pat. No.

5,273,608, which is hereby incorporated herein by reference. Commercially available photovoltaic devices can be manipulated (e.g., by backing with a substrate) in order to provide the photovoltaic elements used in the present invention.

The top surface of a photovoltaic element is the surface presenting the photovoltaically-active areas of its one or more photoelectric cells. When installed, the photovoltaic elements used in the present invention should be oriented so that their top surfaces are able to be illuminated by solar radiation.

A photovoltaic element also has an operating wavelength range. Solar radiation includes light of wavelengths spanning the near UV, the visible, and the near infrared spectra. As used herein, the term "solar radiation," when used without further elaboration means radiation in the wavelength range of 300 nm to 2500 nm, inclusive. Different photovoltaic elements have different power generation efficiencies with respect to different parts of the solar spectrum. Amorphous doped silicon is most efficient at visible wavelengths, and polycrystalline doped silicon and monocrystalline doped silicon are most efficient at near-infrared wavelengths. As used herein, the operating wavelength range of a photovoltaic element is the wavelength range over which the relative spectral response is at least 10% of the maximal spectral response. According to certain embodiments of the invention, the operating wavelength range of the photovoltaic element falls within the range of about 300 nm to about 2500 nm. In certain embodiments of the invention, the operating wavelength range of the photovoltaic element falls within the range of about 300 nm to about 1200 nm.

The present invention can be practiced using any of a number of types of roofing elements. For example, the roofing element can be a bituminous roofing element, such as a granule-coated asphalt shingle, for example dimensional or architectural shingles available under the trade names PRESIDENTIAL, GRAND MANOR, INDEPENDENCE available from CertainTeed Corporation. Of course, other asphalt shingle such as conventional three-tab shingles can be used in practicing the present invention. In other embodiments of the invention, the roofing element is a polymeric roofing element, such as a polymeric slate, tile or shake. Polymeric roofing elements suitable for use in the present invention are described, for example, in U.S. Patent Application Publication no. 2009/0000222, which is hereby incorporated herein by reference in its entirety. As the person of skill in the art will recognize, other types of roofing elements, such as slates, ceramic tiles, roofing membranes, and wooden shakes, can be used in practicing various aspects of the present invention.

In certain embodiments of the invention, the photovoltaic element can be affixed to the roofing element through a tie layer, as described in the U.S Patent Application Publication no. US 2009/0133340, which is hereby incorporated herein by reference in its entirety. Examples of suitable tie layers, depending on the application, include oxidized asphalt, SBS-modified asphalt, APP-modified asphalt, adhesives, polypropylene/EVA blends, pressure-sensitive adhesives, and maleic anhydride-grafted EVA, polypropylene/polyethylene copolymers, or functionalized EVA. The tie layer can also include a layer of fibrous material partially embedded in the material of the roofing substrate.

Another aspect of the invention is a method for accessing the top end of a first photovoltaic element in a photovoltaic roofing system (e.g., in any of the embodiments described above) including a plurality of horizontally-arranged first photovoltaic roofing elements disposed on the roof deck, each having a top end and a bottom end; one or more first flashing elements disposed on the roof deck upwards from the first photovoltaic roofing elements, each first flashing element having a top end, and a bottom end overlapping the top end of one or more of the first photovoltaic roofing elements; and a plurality of horizontally-arranged second photovoltaic roofing elements disposed on the roof deck upwards from the one or more first flashing elements, each second photovoltaic roofing element having a top end, and a bottom end overlapping the top end of one or more of the first flashing elements, the second photovoltaic roofing elements not overlapping the bottom end of any of the first flashing elements. The method includes lifting the bottom end of one or more of the first flashing elements away from the top end of the first photovoltaic element.

In certain embodiments, the photovoltaic roofing system further includes one or more fasteners affixing the top end of the one or more first photovoltaic roofing elements to the roof deck, and the method further includes (e.g., while the bottom end of the one or more first flashing elements is lifted away from the top end of the first photovoltaic element), removing the one or more fasteners, and removing the first photovoltaic element from the plurality of horizontally-arranged first photovoltaic elements. The method can in certain embodiments further include installing a new first photovoltaic roofing element in the gap formed by the removal of the first photovoltaic element, affixing its top end to the roof deck with one or more fasteners, then covering the top end of the new first photovoltaic roofing element with the one or more first flashing elements.

Another aspect of the invention is a method for accessing wiring in a photovoltaic roofing system (e.g., as in any of the embodiments described above) including a plurality of horizontally-arranged first photovoltaic roofing elements disposed on the roof deck, each having a top end and a bottom end; one or more first flashing elements disposed on the roof deck upwards from the first photovoltaic roofing elements, each first flashing element having a top end, and a bottom end overlapping the top end of one or more of the first photovoltaic roofing elements; a plurality of horizontally-arranged second photovoltaic roofing elements disposed on the roof deck upwards from the one or more first flashing elements, each second photovoltaic roofing element having a top end, and a bottom end overlapping the top end of one or more of the first flashing elements, the second photovoltaic roofing elements not overlapping the bottom end of any of the first flashing elements; and wiring disposed beneath the one or more first flashing elements. The method includes lifting the bottom end of one or more of the first flashing elements away from the top end of the first photovoltaic element, thereby exposing the wiring. It may be necessary to detach the bottom end of the first flashing element from the underlying first photovoltaic element.

It will be apparent to those skilled in the art that various modifications and variations can be made to the present invention without departing from the scope of the invention. Thus, it is intended that the present invention cover the modifications and variations of this invention provided they come within the scope of the appended claims and their equivalents.

What is claimed is:

1. A photovoltaic roofing system for use on a roof deck, the photovoltaic roofing system comprising:

a plurality of horizontally-arranged first photovoltaic roofing elements disposed on the roof deck, each first photovoltaic roofing element comprising a photovoltaic element disposed on a roofing element, each first photovoltaic roofing element having a top end and a bottom end;

one or more first flashing elements disposed on the roof deck upwards from the first photovoltaic roofing elements, the first flashing elements not having any photovoltaic media disposed thereon, the first flashing element having a top end, and a bottom end overlapping the top end of one or more of the first photovoltaic roofing elements; and a plurality of horizontally-arranged second photovoltaic roofing elements disposed on the roof deck upwards from the one or more first flashing elements, each second photovoltaic roofing element comprising a photovoltaic element disposed on a roofing element, each second photovoltaic roofing element having a top end, and a bottom end overlapping the top end of one or more of the first flashing elements, the second photovoltaic roofing elements not overlapping the bottom end of any of the first flashing elements.

2. The photovoltaic roofing system according to claim 1, further comprising wiring interconnecting the photovoltaic roofing elements, wherein the wiring is disposed beneath the one or more first flashing elements.

3. The photovoltaic roofing system according to claim 1, wherein the second photovoltaic roofing elements do not overlap the first photovoltaic roofing elements.

4. The photovoltaic roofing system according to claim 1, wherein the first photovoltaic roofing elements are affixed to the roof deck by one or more fasteners, which are overlapped by the one or more first flashing elements.

5. The photovoltaic roofing system according to claim 1, wherein the first flashing element is affixed with a fastener to the first photovoltaic roofing element that it overlaps, and wherein the fastener does not penetrate both the first flashing element and the first photovoltaic roofing element.

6. The photovoltaic roofing system according to claim 1, wherein the first flashing element interlocks with one or more of the first photovoltaic roofing elements.

7. The photovoltaic roofing system according to claim 1, wherein the first flashing element interlocks with one or more of the second photovoltaic roofing elements.

8. The photovoltaic roofing system according to claim 1, further including a gasket material disposed between the first flashing element and the first photovoltaic roofing element; between the first flashing element and the second photovoltaic roofing element; or both.

9. The photovoltaic roofing system according to claim 8, wherein the gasket material is a polymer with a Shore A hardness in the range of 30-100.

10. The photovoltaic roofing system according to claim 1, wherein the first flashing element includes a hinge that allows the bottom end of the first flashing element to be lifted away from the surface of the first photovoltaic element by at least about 3 inches.

11. The photovoltaic roofing system according to claim 1, wherein at least a portion of the flashing element is flexible enough such that its bottom end can be lifted away from the surface of the first photovoltaic element by at least about 3 inches without undergoing plastic deformation.

12. The photovoltaic roofing system according to claim 1, wherein each first flashing element has a wire management feature on its downward-facing surface.

13. The photovoltaic roofing system according to claim 12, wherein the wire management feature is a wire clip or tie, one or more downward-facing flanges forming a channel with the surface upon which the first flashing element is disposed; or a conduit.

14. The photovoltaic roofing system according to claim 1, wherein each first flashing element is formed from a material, and the material of each first flashing element has a Young's Modulus of at least about 30,000 psi and a Shore D Durometer Hardness measurement of greater than 45.

15. The photovoltaic roofing system according to claim 1, wherein at least part of the upward facing surface of each first flashing element is slip-resistant.

16. The photovoltaic roofing system according to claim 1, wherein each first flashing element has an exposed area, and the exposed area of each first flashing element has a dimension up the roof in a range of about 2 inches to about 12 inches.

17. The photovoltaic roofing system according to claim 1, further comprising one or more second flashing elements disposed on the roof deck upwards from the second photovoltaic roofing elements, the second flashing elements not having any photovoltaic media disposed thereon, each second flashing element having a top end, and a bottom end overlapping the top end of one or more of the second photovoltaic roofing elements;

a plurality of horizontally-arranged third photovoltaic roofing elements disposed on the roof deck upwards from the one or more second flashing elements, each third photovoltaic roofing element comprising a photovoltaic element disposed on a roofing element, each third photovoltaic roofing element having a top end, and a bottom end overlapping the top end of one or more of the second flashing elements, the third photovoltaic roofing elements not overlapping the bottom end of any of the second flashing elements;

one or more third flashing elements disposed on the roof deck upwards from the third photovoltaic roofing elements, the third flashing elements not having any photovoltaic media disposed thereon, each third flashing element having a top end, and a bottom end overlapping the top end of one or more of the third photovoltaic roofing elements; and a plurality of horizontally-arranged fourth photovoltaic roofing elements disposed on the roof deck upwards from the one or more third flashing elements, each fourth photovoltaic roofing element comprising a photovoltaic element disposed on a roofing element, each fourth photovoltaic roofing element having a top end, and a bottom end overlapping the top end of one or more of the third flashing elements, the fourth photovoltaic roofing elements not overlapping the bottom end of any of the third flashing elements.

18. A method for accessing the top end of a first photovoltaic element in a photovoltaic roofing system according to claim 1, the method comprising lifting the bottom end of one or more of the first flashing elements away from the top end of the first photovoltaic element.

19. The method according to claim 18, wherein the photovoltaic roofing system further comprises one or more fasteners affixing the top end of the one or more first photovoltaic roofing elements to the roof deck, the method further including, while the bottom end of the one or more first flashing elements is lifted away from the top end of the first photovoltaic element, removing the one or more fasteners, and removing the first photovoltaic element from the plurality of horizontally-arranged first photovoltaic elements.

20. The method according to claim 19, the method further comprising, after removing the first photovoltaic element from the plurality of horizontally-arranged first photovoltaic elements, installing a new first photovoltaic roofing element in the gap formed by the removal of the first photovoltaic element, affixing its top end to the roof deck with one or more fasteners, then covering the top end of the new first photovoltaic roofing element with the one or more first flashing elements.

21. A method for accessing wiring in a photovoltaic roofing system according to claim 1, the photovoltaic roofing system including wiring disposed beneath the one or more first flashing elements, the method comprising lifting the bottom end of one or more of the first flashing elements away from the top end of the first photovoltaic element, thereby exposing the wiring.

* * * * *